(No Model.)
J. E. LOUGHRIDGE.
BRAKE MECHANISM FOR CARS.
No. 484,598. Patented Oct. 18, 1892.
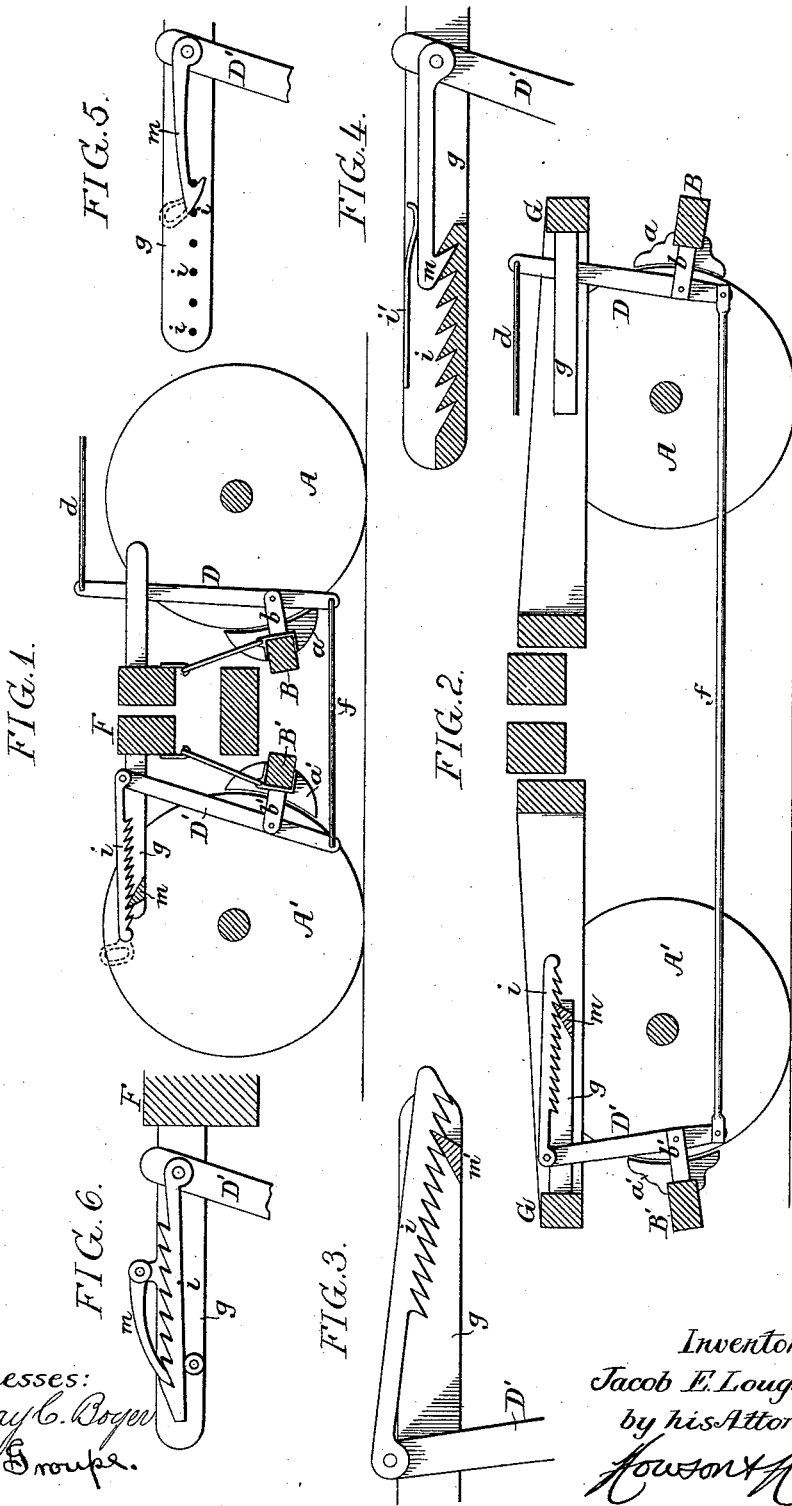
Witnesses:
Murray C. Boyer
A. V. Groupe
Inventor:
Jacob E. Loughridge
by his Attorneys
Howson & Howson

United States Patent Office.

JACOB E. LOUGHRIDGE, OF PHILADELPHIA, PENNSYLVANIA, ASSIGNOR TO THE LOUGHRIDGE BRAKE AND CAR COMPANY, OF CAMDEN, NEW JERSEY.

BRAKE MECHANISM FOR CARS.

SPECIFICATION forming part of Letters Patent No. 484,598, dated October 18, 1892.

Application filed May 21, 1891. Renewed August 13, 1892. Serial No. 442,955. (No model.)

*To all whom it may concern:*

Be it known that I, JACOB E. LOUGHRIDGE, a citizen of the United States, and a resident of Philadelphia, Pennsylvania, have invented certain Improvements in Braking Mechanism for Railroad-Cars, of which the following is a specification.

My invention consists, mainly, in so constructing what may be termed the "compensating element" of braking mechanism for railroad-cars that said compensating element, while substantially retaining its various positions of advancement, cannot, by reason of any of its compensating or adjusting movements, lock the brake-shoes in contact with the wheels.

The invention also consists in a special combination of parts in brake-gearing with the view of rendering the compensation either automatic or capable of being readily effected without any material change in the present construction of the braking mechanism, whether hand or power actuated.

In the accompanying drawings my improved compensating element of the brake-gear is illustrated in connection with the "dead-lever" of the braking mechanism, as in my patent, No. 433,294, dated July 29, 1890.

Figure 1 is a diagram illustrating the application of the invention to the ordinary freight-car brake-gear; Fig. 2, a view illustrating the application of the invention to an ordinary form of passenger-car brake-gear; Fig. 3, an enlarged sectional view of part of the device; Figs. 4, 5, and 6, similar views illustrating modifications of the compensating device.

In both forms of brake-gear shown in the drawings A A' represent the two wheels at one side of the truck, and B B' the two brake-beams suspended from the truck, as usual, and carrying the brake-shoes $a$ $a'$, respectively, the shoe $a$ acting on the wheel A and the shoe $a'$ acting on the wheel A'.

Hung to a bracket $b$ on the brake-beam B is what is known as the "live" lever D of the brake-gear, the long arm of this lever being connected by a rod $d$ to the brake-operating device, either hand or power, and the short arm of the lever being connected by a rod $f$ to the short arm of the lever D', known as the "dead" lever, which is hung to a bracket $b'$ on the brake-beam B', the upper end of this dead-lever being guided in a slotted arm or bracket $g$, which, in the case of the truck shown in Fig. 1, is secured to and projects from the bolster F, and in the case of the truck shown in Fig. 2 is carried by one of the sills G of the truck. The upper end of the dead-lever is usually retained longitudinally in the guide $g$ by means of a pivot-pin constituting the fulcrum of the lever, and as the shoes or other portions of the brake-gear wear or as the parts of the gear slacken by reason of the stretch or "spring" of any of them the pin must be shifted, so as to advance the upper or fulcrum end of the dead-lever in the guide in order to compensate for such wear or slackening; and in my former patent before alluded to I described an automatic compensating bearing or fulcrum for the upper end of the dead-lever, said bearing being in the form of a wedge having a constant tendency to follow and hold any advance in the position of the fulcrum end of the dead-lever, such as would be caused by the shaking movement of the car and permitted by wear or looseness of parts of the brake-operating gear. In that form of my present invention shown in Figs. 1 to 3, however, I use in place of the wedge-like fulcrum-block $a$ rack $i$, hung to the upper end of the dead-lever and having teeth engaging with a pawl-tooth $m$, formed on or secured to the guiding-bracket $g$ for the upper end of said dead-lever, the teeth of the rack being retained in engagement with said pawl-tooth $m$ by reason of the weight of the rack, or, if desired, by means of a spring $i'$, such as shown in connection with the pawl in Fig. 4. It will thus be seen that any movement of the upper end of the dead-lever D' in the direction of the arrow, Fig. 1, to the extent of one or more of the teeth of the rack $i$ will cause said rack to move over the pawl-tooth $m$, which will prevent its return. Hence the fulcrum-point of the lever will be correspondingly advanced. The pawl-tooth $m$ and the teeth of the rack $i$ are, however, undercut, as shown in Fig. 3. Therefore, after a tooth of the rack has passed the point of the pawl-tooth m it will, on falling into engagement with said tooth, permit a slight retraction of the rack, and therefore of the upper or fulcrum end of the dead-lever D', consequently permitting the brake-shoes to fall clear of the wheels to such an extent as to prevent the rigid locking of the brake-shoes in contact with said wheels, which would be caused if the slack of the lever D' was taken up and held while the shoes were thus in contact.

It is manifest that the position or relation of the rack and pawl may be changed without departing from my invention—for instance, the rack may be carried by the guide g and the pawl-tooth by the lever D', as shown in Fig. 4. The rack may also be in open or ladder-like form, if desired, instead of having solid undercut teeth, as shown, for instance, in Fig. 5, the rack interlocking with a hook or pawl having an undercut head, or the point of a pawl may be so reduced in thickness that it will follow up the undercut side of a tooth and seek the root of the same. An instance of this construction is shown in Fig. 6, the pawl being hung to lugs on the guide g and engaging with teeth formed on the upper face of a rack carried by the upper end of the dead-lever and resting on a suitable support in the guide g, and it will be evident that the pawl may be hung to any other fixed part of the frame. The rack and pawl also provide a convenient means of hand-adjustment for compensating for wear or slackening of any part of the brake-gear, the pawl or rack being readily accessible from the side of the car and being provided with a suitable hand-hold, as shown by dotted lines in Figs. 1 and 5, for instance, to facilitate manipulation.

Although I have illustrated my improved undercut rack-and-pawl compensating device as applied to the dead-lever of the braking mechanism, it should be understood that this is merely for example, and that my invention is not limited to the use of said compensating device in this connection. As an instance of another use of the same, I may cite its application to the intermediate lever E of the braking device shown in Fig. 15 of my patent, No. 422,237, as a substitute for the filling-block J, there used to hold the fulcrum of the lever in its successive positions of advancement, and the undercutting feature may be applied with the advantage hereinbefore noted to all of that class of compensating devices which consist of a rack and pawl or interlocking racks used in connection with various forms of car-brake mechanism.

Having thus described my invention, I claim and desire to secure by Letters Patent—

1. The combination of the dead-lever of railway-car-brake mechanism with an engaging rack and pawl for retaining the fulcrum end of said lever in its successive positions of advancement, one or both of said engaging portions having undercut teeth, substantially as specified.

2. The within-described device for compensating for wear or looseness of parts of car-brake mechanism, said compensating device comprising elements with undercut engaging portions, whereby after each successive advance or movement of compensation there will be a slight backing off to prevent the locking of the brake-shoes against the wheels, substantially as specified.

In testimony whereof I have signed my name to this specification in the presence of two subscribing witnesses.

JACOB E. LOUGHRIDGE.

Witnesses:
EUGENE ELTERICH,
HARRY SMITH.